United States Patent
Kondo et al.

(10) Patent No.: US 8,045,109 B2
(45) Date of Patent: Oct. 25, 2011

(54) LIQUID CRYSTAL DISPLAY DEVICE OPERATED WITH AN IN-PLANE SWITCHING SYSTEM AND MANUFACTURING METHOD THEREOF

(75) Inventors: Yoshikazu Kondo, Tokyo (JP); Yoshiro Toda, Tokyo (JP); Wataru Mizuno, Tokyo (JP)

(73) Assignee: Konica Minolta Holdings, Inc. (JP)

( * ) Notice: Subject to any disclaimer, the term of this patent is extended or adjusted under 35 U.S.C. 154(b) by 280 days.

(21) Appl. No.: 12/375,894

(22) PCT Filed: Jul. 17, 2007

(86) PCT No.: PCT/JP2007/064070
§ 371 (c)(1),
(2), (4) Date: Jan. 30, 2009

(87) PCT Pub. No.: WO2008/015902
PCT Pub. Date: Feb. 7, 2008

(65) Prior Publication Data
US 2010/0002176 A1    Jan. 7, 2010

(30) Foreign Application Priority Data
Aug. 4, 2006  (JP) .................................. 2006-212991

(51) Int. Cl.
*G02F 1/1333* (2006.01)
*G02F 1/1343* (2006.01)
(52) U.S. Cl. ........................................ 349/122; 349/141
(58) Field of Classification Search .................. 349/122, 349/141, 187
See application file for complete search history.

(56) References Cited

U.S. PATENT DOCUMENTS

| | | | |
|---|---|---|---|
| 5,870,160 A | * | 2/1999 | Yanagawa et al. ............. 349/141 |
| 7,435,668 B2 | * | 10/2008 | Machida et al. .............. 438/487 |
| 2003/0207093 A1 | * | 11/2003 | Tsuji et al. .................... 428/209 |

FOREIGN PATENT DOCUMENTS

| | | | |
|---|---|---|---|
| EP | 1316626 A2 | | 6/2003 |
| JP | 9-105918 A | | 4/1997 |
| JP | 09105918 A | * | 4/1997 |
| JP | 2003-234028 A | | 8/2003 |

OTHER PUBLICATIONS

International Search Report for International Patent Application No. PCT/JP2007/064070; Date of mailing Sep. 25, 2007; with English translation.

* cited by examiner

*Primary Examiner* — Mike Qi
(74) *Attorney, Agent, or Firm* — Cantor Colburn LLP

(57) ABSTRACT

Provided are a method of manufacturing liquid crystal display device possessing transparent conductive layer exhibiting excellent optical transparency, resistance characteristic, evenness, adhesion to substrate, and hardness, and liquid crystal display device thereof. The liquid crystal display device possessing liquid crystal display panel and backlight unit, wherein liquid crystal display panel has a structure in which display electrode and reference electrode are provided on surface of region corresponding to unit pixel on liquid crystal layer side of one transparent substrate or each of both transparent substrates provided facing to each other via liquid crystal layer, and light transmitting liquid crystal layer is modulated by electric field generated parallel to transparent substrate between reference electrode and display electrode, wherein the method of manufacturing liquid crystal display device possesses the step of forming transparent conductive layer in pixel region by atmospheric pressure plasma method employing nitrogen gas as thin film forming gas.

6 Claims, 3 Drawing Sheets

LIQUID CRYSTAL DISPLAY DEVICE OPERATED WITH AN IN-PLANE SWITCHING SYSTEM AND MANUFACTURING METHOD THEREOF

Cross Reference To Related Applications

This is a U.S. national stage of application No. PCT/JP2007/064070, filed on 17 July 2007. Priority under 35 U.S.C. §119(a) and 35 U.S.C. §365(b) is claimed from Japanese Application No. 2006-212991, filed Aug. 4, 2006, the disclosure of which is also incorporated herein by reference.

TECHNICAL FIELD

The present invention relates to a method of manufacturing a liquid crystal display device and the liquid crystal display device, and specifically to a method of manufacturing a liquid crystal display device and the liquid crystal display device possessing a transparent conductive layer exhibiting excellent optical transparency, resistance characteristic, evenness and adhesion to a substrate.

BACKGROUND

In general, as to an active matrix liquid crystal display device fitted with TFT, a pixel electrode and the TFT to control voltage applied to the pixel electrode possess matrix-aligned active matrix substrates, liquid crystals are sandwiched between this active matrix substrate and a facing substrate, and the liquid crystals are driven by voltage applied between the pixel electrode and another electrode. In this case, there is a twisted nematic liquid crystal and vertical alignment system liquid crystal display device in which the pixel electrode of the active matrix substrate is a transparent electrode, and voltage is applied between it and a transparent common electrode formed on the facing substrate as another electrode to drive liquid crystals, or an in-plane switching system liquid crystal display device in which employing a pixel electrode of an active matrix substrate and a counterpart pectinate electrode to the common electrode, voltage is applied between these electrodes to drive liquid crystals. At any rate, the foregoing TFT and pixel electrode are desired to be formed on the active matrix substrate, and at present, these TFT and pixel electrode are formed by a photolithography technique.

A liquid crystal display device called the in-plane switching system liquid crystal display device is generally compared with a liquid crystal display device called a twisted nematic liquid crystal and vertical alignment system liquid crystal display device, and is one in which a display electrode and a reference electrode are provided on the surface of the region corresponding to a unit pixel on the liquid crystal layer side of one transparent substrate or both transparent substrates among the transparent substrates provided facing to each other via the liquid crystal layer, and light transmitting the foregoing liquid crystal layer is modulated by electric field generated parallel to the transparent substrate between this display electrode and the reference electrode.

On the other hand, the twisted nematic liquid crystal and vertical alignment system liquid crystal display device possesses a pixel electrode composed of a transparent electrode and a common electrode provided facing on the surface of each region corresponding to a unit pixel on the liquid crystal layer side of the transparent substrate provided facing to each other via the liquid crystal layer, and is one in which light transmitting the foregoing liquid crystal layer is modulated by electric field generated perpendicularly to the transparent substrate between this pixel electrode and the common electrode. The in-plane switching system liquid crystal display device differing from such the twisted nematic liquid crystal and vertical alignment system liquid crystal display device, by which clear images can be confirmed even though observing from a viewing field at a large angle with respect to the display surface, is known as one exhibiting so-called excellent viewing field at an angle. In addition, liquid crystal displays composed of such the structure are disclosed in detail, for example, in Japanese Patent O.P.I. Publication No. 5-505247, Japanese Patent Examined Publication No. 63-21907, and Japanese Patent O.P.I. Publication No. 6-160878.

Such the in-plane switching system liquid crystal display device produces a problem such that a display trouble which has not been so far experienced in the twisted nematic liquid crystal and vertical alignment system liquid crystal display device is generated when high voltage such as static charge or the like is applied from outside the surface of the liquid crystal display panel. That is, the in-plane switching system liquid crystal display device has a structure having no conductive layer in which a shielding function against static charge or the like from outside is provided between the display electrode and the reference electrode placed parallel or nearly parallel to the liquid crystal. Supposedly, when such the conductive layer is provided, electric field from the display electrode is terminated not on the reference electrode side but on the conductive layer side, whereby displaying can not be appropriately carried out with the electric field.

Electric field corresponding to a picture signal generated parallel to the transparent substrate between the display electrode and the reference electrode because of no possession of a shielding function is influenced by static charge or the like from outside. The liquid crystal display panel itself is charged by static charge or the like from the outside, and this electrification generates electric field perpendicularly to the transparent substrate.

In order to solve the above-described problem, concerning the case where high voltage such as static charge or the like is applied from outside the surface of a liquid crystal display device, disclosed is the liquid crystal display device exhibiting reduced generation of the display trouble (refer to Patent Document 1, for example).

However, as the in-plane switching system liquid crystal display device or the twisted nematic liquid crystal and vertical alignment system liquid crystal display device, it was found out that in cases where a conductive layer was formed by a sputtering method, short-circuiting was easy to be generated in an electrode section, and the transparent substrate was damaged, resulting in occurrence of the broken transparent substrate. Further, since bubbles are generated in a liquid crystal layer when the conductive layer is formed by a sputtering method after filling liquid crystals in the liquid crystal layer, what is happening now is that a high-definition liquid crystal display device can not be obtained.

Further, known is a method of forming a conductive layer via coating of a coating solution containing conductive particles, but since a sintering treatment has to be carried out at a high temperature after drying a conductive film formed via a coating process in this method, a great deal of time is desired to be consumed to form the conductive film, and there is produced a problem such as lowering of optical transparency of a formed conductive film and weak adhesion to a substrate.

Patent Document 1: Japanese Patent No. 2758864

DISCLOSURE OF THE INVENTION

Problems to be Solved by the Invention

The present invention was made on the basis of the above-described situation. It is an object of the present invention to provide a method of manufacturing a liquid crystal display device and the liquid crystal display device possessing a transparent conductive layer exhibiting excellent optical transparency, resistance characteristic, evenness and adhesion to a substrate.

Means to Solve the Problems

The above-described object of the present invention is accomplished by the following structures.

(Structure 1) A method of manufacturing a liquid crystal display device comprising a liquid crystal display panel and a backlight unit to transmit light on a display surface side of the liquid crystal display panel, wherein the liquid crystal display panel has a structure in which a display electrode and a reference electrode are provided on a surface of a region corresponding to a unit pixel on a liquid crystal layer side of one transparent substrate or each of both transparent substrates among the transparent substrates provided facing to each other via the liquid crystal layer, and light transmitting the liquid crystal layer is modulated by electric field generated parallel to the transparent substrate between the reference electrode and the display electrode to which a picture signal is supplied from a picture signal line via at least a switching element, wherein the transparent substrate situated on a remote position side with respect to the backlight unit among the transparent substrates in the liquid crystal display panel is the transparent substrate on a side of a position where no switching element is formed, and has a transparent conductive layer exhibiting optical transparency on a surface side opposite the liquid crystal layer of the transparent substrate, and the method of manufacturing a liquid crystal display device comprises the step of forming the transparent conductive layer in at least a pixel region by an atmospheric pressure plasma method employing at least nitrogen gas as a thin film forming gas.

(Structure 2) The method of Structure 1, comprising the step of operating by an in-plane switching system, the liquid crystal display panel having a structure in which a display electrode and a reference electrode are provided on a surface of a region corresponding to a unit pixel on a liquid crystal layer side of one transparent substrate among the transparent substrates provided facing to each other via the liquid crystal layer, and light transmitting the liquid crystal layer is modulated by electric field generated parallel to the transparent substrate between the reference electrode and the display electrode to which a picture signal is supplied from a picture signal line via at least a switching element.

(Structure 3) The method of Structure 1 or 2, wherein the atmospheric pressure plasma method is a remote plasma type atmospheric pressure plasma method with which a substrate, on which a film is formed, is provided in a region other than a spacing between electrodes.

(Structure 4) The method of any one of Structures 1-3, comprising the step of forming the transparent conductive layer exhibiting optical transparency on a surface side opposite the liquid crystal layer of the transparent substrate by the atmospheric pressure plasma method with at least nitrogen gas as a thin film forming gas, after filling liquid crystals in the liquid crystal layer provided between the transparent substrates.

(Structure 5) A liquid crystal display device comprising a liquid crystal display panel and a backlight unit to transmit light on a display surface side of the liquid crystal display panel, wherein the liquid crystal display panel has a structure in which a display electrode and a reference electrode are provided on a surface of a region corresponding to a unit pixel on a liquid crystal layer side of one transparent substrate or each of both transparent substrates among the transparent substrates provided facing to each other via the liquid crystal layer, and light transmitting the liquid crystal layer is modulated by electric field generated parallel to the transparent substrate between the reference electrode and the display electrode to which a picture signal is supplied from a picture signal line via at least a switching element, wherein the transparent substrate situated on a remote position side with respect to the backlight unit among the transparent substrates in the liquid crystal display panel is the transparent substrate on a side of a position where no switching element is formed, and has a transparent conductive layer exhibiting optical transparency on a surface side opposite the liquid crystal layer of the transparent substrate, and the method of manufacturing a liquid crystal display device comprises the step of forming the transparent conductive layer in at least a pixel region by an atmospheric pressure plasma method employing at least nitrogen gas as a thin film forming gas.

(Structure 6) The liquid crystal display device of Structure 5, comprising the liquid crystal display panel operated by an in-plane switching system, having a structure in which a display electrode and a reference electrode are provided on a surface of a region corresponding to a unit pixel on a liquid crystal layer side of one transparent substrate among the transparent substrates provided facing to each other via the liquid crystal layer, and light transmitting the liquid crystal layer is modulated by electric field generated parallel to the transparent substrate between the reference electrode and the display electrode to which a picture signal is supplied from a picture signal line via at least a switching element.

(Structure 7) The liquid crystal display device of Structure 5 or 6 according to the atmospheric pressure plasma method, comprising a liquid crystal display device according to a remote plasma type atmospheric pressure plasma method with which a substrate, on which a film is formed, is provided in a region other than a spacing between electrodes.

(Structure 8) The liquid crystal display device of any one of Structures 5-7, comprising the transparent conductive layer exhibiting optical transparency on a surface side opposite the liquid crystal layer of the transparent substrate, that is formed by the atmospheric pressure plasma method with at least nitrogen gas as a thin film forming gas, after filling liquid crystals in the liquid crystal layer provided between the transparent substrates.

EFFECT OF THE INVENTION

In the present invention, provided can be a method of manufacturing a liquid crystal display device and the liquid crystal display device possessing a transparent conductive layer exhibiting excellent optical transparency, resistance characteristic, evenness and adhesion to a substrate.

EXPLANATION OF NUMERALS

Figure 1:
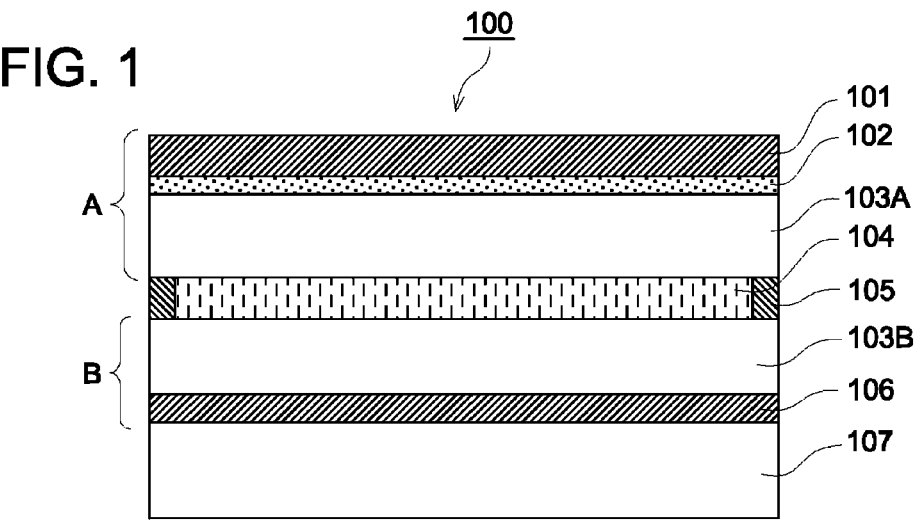
FIG. 1 is a schematic cross-sectional view showing an example of a structure of a liquid crystal display element fitted with a backlight unit of the present invention.

1 Color filter substrate
2 Array substrate
3, 104 Liquid crystal layer
4, 105 Sealing member
5a, 5b, 103A, 103B Transparent substrate
6 Black matrix region
7R, 7G, 7R Color pixel region
8 Protective film
9 Transparent electrode film (Electrode)
10a, 10b Oriented film
11 Spherical solid spacer
12, 102 Transparent conductive layer
13, 107 Backlight unit
21 Atmospheric pressure plasma discharge treatment apparatus
22 Gas containing discharge gas
23 Mixed gas
24, 25 Flow path
27 Electrode cooling member
31 Power supply
41, 41a, 41b Electrode
42 Dielectric
43 Discharge space
44 Hollow structure
45 Mixture space
46 Substrate
47 Movable stage or movable stage electrode
48 Exhaust gas flow path
49 Exhaust gas flow path forming member
100 Liquid crystal display panel
101, 106 Polarizing plate
A Upper substrate
B Lower substrate
C, D, E Electrode unit
G Gas
L Liquid crystal (Polarizer)

DESCRIPTION OF THE PREFERRED EMBODIMENTS

Next, the preferred embodiments of the present invention will now be described in detail.

After considerable effort during intensive studies on the basis of the above-described situation, the inventors have found out those described below, and accomplished the present invention. In a method of manufacturing a liquid crystal display device equipped with a liquid crystal display panel and a backlight unit to transmit light on the display surface side of the liquid crystal display panel, having a structure in which a display electrode and a reference electrode are provided on the surface of the region corresponding to a unit pixel on the liquid crystal layer side of one transparent substrate or each of both transparent substrates among the transparent substrates provided facing to each other via the liquid crystal layer in the liquid crystal display panel, and light transmitting the liquid crystal layer is modulated by electric field generated parallel to the transparent substrate between the reference electrode and the display electrode to which a picture signal is supplied from a picture signal line via at least a switching element, the transparent substrate situated on the remote position side with respect to the backlight unit among the transparent substrates in the liquid crystal display panel is the transparent substrate on the side of a position where no switching element is formed, and has a transparent conductive layer exhibiting optical transparency on the surface side opposite the liquid crystal layer of the transparent substrate, and the method of manufacturing a liquid crystal display device comprising the transparent conductive layer exhibiting excellent optical transparency, resistance characteristic, evenness, adhesion to a substrate, and hardness can be realized via the method of manufacturing a liquid crystal display device comprising the step of forming the transparent conductive layer in at least a pixel region by an atmospheric pressure plasma method employing at least nitrogen gas as a thin film forming gas.

Conventionally, an evaporation method, a sputtering method, an ion plating method, a coating method or the like is known as a method to form a transparent conductive layer on a transparent substrate alone, but in the case of a method to form a transparent conductive layer on the liquid crystal element surface, there is considerable difficulty in view of influence to liquid crystal element parts and formation of the transparent conductive layer as a thin film exhibiting extremely high transparency.

As described above, a method of forming a transparent conductive layer by coating a coating solution containing conductive particles on the liquid crystal element part surface, but in the case of this method, the liquid crystal element part itself is exposed at high temperature since a sintering treatment is conducted at high temperature after drying a conductive film formed by the coating method, resulting in unfavorable influence. A great deal of time is also consumed to form a conductive film, and further, it is extremely difficult to form a conductive film having an even thickness on the surface of an assembled liquid crystal element. Further, there is another problem such that the resulting conductive film is to exhibit lowered optical transparency and weak adhesion to a substrate. Also in the case of a method of forming a conductive film by a vacuum evaporation, for example, properties and quality of assembled liquid crystal element parts are influenced, and the manufacturing process is difficult to be arranged suitably since evaporation is desired to be conducted under the severe condition such as vacuum or the like, resulting in occurrence of a big trouble such as large-scale production equipment. Also in the case of a method of forming a transparent conductive layer on the assembled liquid crystal display element surface by a sputtering method, it was found out that an electrode section was easy to be short-circuited, and a transparent substrate was also easy to be damaged, resulting in the broken transparent substrate and so forth. It was also found out that when forming a conductive layer by a sputtering method under the condition that liquid crystals were filled in a liquid crystal layer, bubbles were generated, whereby no high-definition liquid crystal display device could be obtained.

After considerable effort during intensive studies on the basis of the above-described problems, the inventors have found out that when forming a conductive film on the transparent substrate as a surface member of an assembled liquid crystal element by an atmospheric plasma method employing at least nitrogen gas as a thin film forming gas, the conductive film is possible to be formed at atmospheric pressure or at near atmospheric pressure, and a treatment temperature during formation of the conductive film was reduced to low temperature, whereby thermal influence to liquid crystal element parts can be inhibited, and transparent conductive layers exhibiting excellent optical transparency, resistance property, and adhesion to a substrate can be obtained with no generation of short-circuit damage of the transparent substrate by a simple method.

Next, the present invention is described in detail.

<<Liquid Crystal Display Element>>

First, the basic structure of a liquid crystal display element in the present invention will be described referring to figures. In addition, the structure of a liquid crystal display element in the present invention is not limited to only figures exemplified herein.

FIG. 1 is a schematic cross-sectional view showing an example of a structure of a liquid crystal display element fitted with a backlight unit of the present invention.

In FIG. 1, as to liquid crystal display panel 100, transparent substrate 103A and transparent substrate 103B are provided at the positions facing to each other via liquid crystal layer 104 sealed with sealing member 105 at both ends, and the main surface side of transparent substrate 103A (the upper side of the figure) is the observation side. Backlight unit 107 is provided on the side of transparent substrate 103B, and the almost entire region of transparent substrate 103B is evenly exposed to observation light from backlight unit 107. In addition, a transparent substrate of the present invention means one having an average transmittance of at least 90% in the visible light region.

Liquid crystal layer 104 formed between transparent substrate 103A and transparent substrate 103B possesses plural pixels provided in the form of matrix in the transverse direction of liquid crystal layer 104, accompanied with an electronic circuit formed on the side of liquid crystal layer 104 of each transparent substrate.

Gathering of each pixel provided in the form of matrix is designed to constitute the display region in the case of observation from the side of transparent substrate 103A.

As to each pixel constituting a display region independently, optical transparency from backlight unit 107 is designed to be controlled by supplying a signal via the electronic circuit.

A so-called in-plane switching system by which electric field generated in liquid crystal layer 104 at each pixel is applied parallel to the transparent substrate surface is preferably employed in order to control optical transparency of each pixel.

In liquid crystal display panel 100 of an in-plane switching system having such the structure, similarly to that of a twisted nematic liquid crystal and vertical alignment system, polarizing plates 101 and 106 each are attached on the surface (surface on the observation side) on the side opposite liquid crystal layer 104 of transparent substrate 103A and on the surface (surface on the backlight unit 107 side) on the side opposite liquid crystal layer 104 of transparent substrate 103B.

It is a feature that the liquid crystal display element of the present invention possesses transparent conductive layer 102 formed by an atmospheric pressure plasma method employing at least nitrogen gas as a thin film forming gas between transparent substrate 103A and polarizing plate 101 provided above transparent substrate 103A. Transparent conductive layer 102 is designed to serve as a conductive film to conduct shielding against electrification such as static charge or the like from outside.

Figure 2:
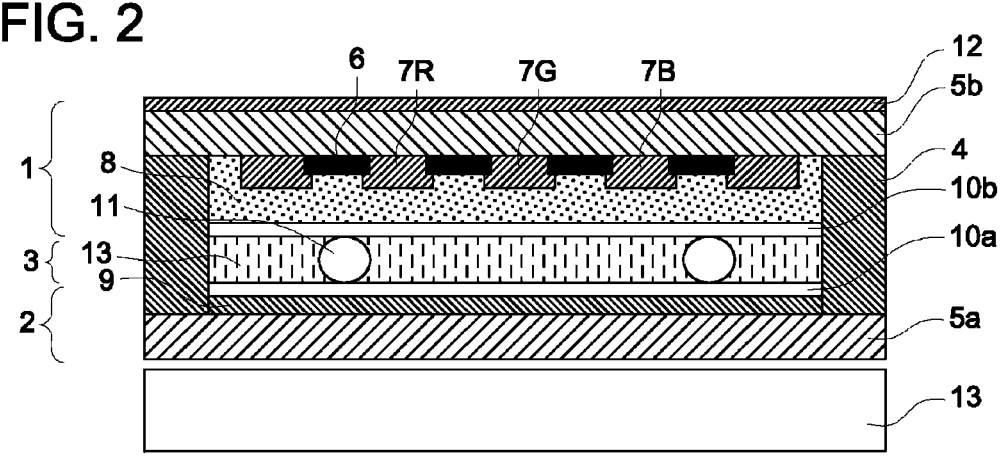
FIG. 2 is a schematic cross-sectional view showing an example of a liquid crystal display element to conduct full-color displaying.

FIG. 2 is a schematic cross-sectional view showing an example of a liquid crystal display element to conduct full-color displaying.

In FIG. 2, as array substrate 2, oriented film 10a, transparent electrode film 9 and transparent substrate 5a are provided in order via liquid crystal layer 3, and backlight 13 is provide on the surface on the side opposite the transparent electrode of transparent substrate 5a. In addition, transparent electrode 9 is used for an in-plane switching system to conduct patterning so as to form an independent electrode pair for each pixel, but it is omitted in the figure. Array substrate 2 is fitted with sealing member 4 formed in the peripheral region surrounding the display region in which liquid crystal layer 3 containing liquid crystal 13 is provided, wherein the liquid crystal layer 3 contains a small amount of spherical solid spacer 11 (for example, 0.3% by weight). Color filter substrate 1 is composed of color pixel regions 7R, 7G and 7B in the central region, and black matrix region 6 at the periphery. Transparent substrate 5b is provided on the upper portion of the color pixel regions in the central region, and transparent conductive layer 12 formed by an atmospheric pressure plasma method employing at least an inert gas as a thin film forming gas is provided thereon.

As to assembling of a liquid crystal display element, array substrate 2 and color filter substrate 1 are placed away to each other in a vacuum chamber of a vacuum assemble apparatus, and color filter substrate 1 is placed precisely on array substrate 2 at normal pressure. Color filter substrate 1 is placed on array substrate 2 by putting the two substrates together while reducing pressure in the vacuum chamber. After the sealing member is attached with an adhesive containing a resin cured via application of UV radiation, for example, and then, transparent conductive layer 12 is formed on transparent substrate 5b by an atmospheric pressure plasma method employing inert gas, liquid crystals are filled in liquid crystal layer 3 from an opening of the sealing member by a vacuum injection method, and the opening of sealing member 4 is sealed to form a liquid crystal display element to conduct full-color displaying.

A method of introducing liquid crystals into a liquid crystal layer in the vacant situation, in which the circumference is sealed with the sealing member, by a vacuum injection method after assembling such the above-described liquid crystal display element is used, but in the case of this method, time-consuming and economical factors to be improved are involved since filling of liquid crystals in the liquid crystal layer takes a lot of time, and an amount of liquid crystals attached to the periphery is large, whereby a post-washing process is desired to be conducted, or the big loss of liquid crystals is produced.

For the above-described problem, in place of the method of introducing liquid crystals into a liquid crystal layer after assembling such the above-described liquid crystal display element, utilized is a method by which after forming sealing member 4 in the peripheral region surrounding the display region before superposing the transparent substrate, liquid crystals are dropped therein, and the member on the upper side is subsequently covered to form a liquid crystal layer. This method is called a One Drop Fill method (ODF method), and this ODF method is preferably applied in a method of manufacturing a liquid crystal display element of the present invention. This ODF method are disclosed as a reference in detail in the specification of U.S. Pat. No. 5,263,888 (Teruhisa Ishihara et al., Nov. 23, 1993).

Figure 3:
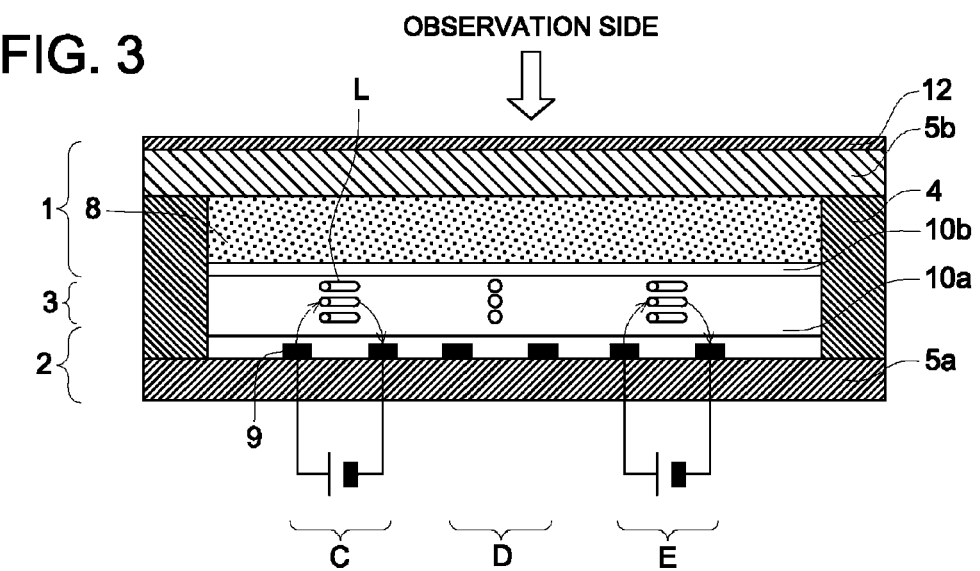
FIG. 3 is a schematic cross-sectional view showing another example of a structure of a liquid crystal display element of the present invention.

FIG. 3 is a schematic cross-sectional view showing another example of a structure of a liquid crystal display element of the present invention.

Also in the case of a liquid crystal display element shown in FIG. 3, shown is an in-plane switching system by which a plurality of electrode pairs 9 are provided on one surface side via liquid crystal layer 3, and orientation of liquid crystals in the liquid crystal layer (polarizer) is changed by applying voltage independently to each of independent electrode pairs to display images.

The in-plane switching method in which electrodes are provided on one surface side via the liquid crystal layer was described in FIG. 1-FIG. 3, but a twisted nematic liquid crystal and vertical alignment system in which electrodes are provided on both sides via the liquid crystal layer can be also utilized for a structure of a liquid crystal display of the present invention.

<<Transparent Conductive Layer>>

It is a feature that a liquid crystal display element of the present invention possesses a transparent conductive layer exhibiting optical transparency on the side opposite a liquid crystal layer of a transparent substrate, and this transparent conductive layer (referred to also as a transparent conductive film) is formed in at least a pixel region by an atmospheric pressure plasma method employing at least nitrogen gas as a thin film forming gas. The transparent conductive layer exhibiting optical transparency described in the present invention means a transparent conductive layer having an average transmittance of at least 90%.

Next, the transparent conductive layer forming material and an atmospheric pressure plasma method to form the transparent conductive layer will be described.

(Transparent Conductive Layer Forming Material)

As the transparent conductive layer of the present invention, the transparent conductive layer forming material is preferably at least one transparent conductive layer forming material as a main component, selected from the group consisting of $In_2O_3$, Sn-doped $In_2O_3$ (ITO), ZnO, $In_2O_3$—ZnO system amorphous oxide (IZO), Al-doped ZnO (AZO), Ga-doped ZnO (GZO) and $SnO_2$, F-doped $SnO_2$ (FTO). An ITO film and an AZO film each have an amorphous structure or a crystalline structure. On the other hand, an IZO film has a crystalline structure.

In the present invention, the transparent conductive layer preferably has a surface specific resistance of $1\times10^9 \Omega/\square$ or less, and more preferably has a surface specific resistance of $1\times10^6 \Omega/\square$ or less.

It is a feature as a method of forming a transparent conductive layer of the present invention that the transparent conductive layer is formed by an atmospheric pressure plasma method in which raw material is subjected to a plasma treatment at atmospheric pressure or at near atmospheric pressure.

Examples of the reactive gas to form a metal oxide layer as a main component of the transparent conductive layer in the atmospheric pressure plasma method include metal alkoxide as a kind of organometallic compound, alkyl metal, β-diketonate, metal calboxylic acid salt, metal dialkylamide and so forth. Further, double alkoxide composed of two kind of metals and those partially substituted by another organic group are usable, but those exhibiting volatile are preferably usable.

Examples thereof include indium hexafluoropentanedionate, indium methyl(trimethyl) acetylacetate, indium acetylacetonate, indium isopropoxide, indium trifluoropentanedionate, tris(2,2,6,6-tetramethyl-3,5-heptanedionato) indium, di-n-butylbis(2,4-pentanedionato) tin, di-n-butyldiacetoxytin, di-t-butyldiacetoxytin, tetra-isopropoxytin, tetrabutopxytin, zinc acetylacetonate and so forth. Among these, indium acetylacetonate, tris(2,2,6,6-tetramethyl-3,5-heptanedionato)indium and zinc acetylacetonate di-n-butyldiacetoxytin are preferred. Further, among the above-described compounds, as the film forming material for a $SnO_2$ film, dibutyltin diacetate, tetrabutyltin, tetramethyltin or the like is preferable. In addition, the $SnO_2$ film may contain fluorine or antimony.

Examples of the reactive gas for doping include isopropoxyaluminum, nickel acetylacetonate, manganese acetylacetonate, boron isopropoxide, n-butoxyantimony, tri-n-butylantimony, di-n-butylbis(2,4-pentanedionato)tin, di-n-butyldiacetoxytin, di-t-butyldiacetoxytin, tetraisopropxytin, tetrabutopxytin, tetrabutyltin, zinc acetylacetonate, hexafluoropropylene, octafluorocyclobutane, carbon tetrafluoride and so forth.

Examples of the reactive gas employed for adjusting resistance of the transparent conductive layer include titanium isopropoxide, tetramethoxysilane, tetraethoxysilane, hexamethyldisiloxane and so forth.

(Atmospheric Pressure Plasma Method)

Next, an atmospheric pressure plasma method applied for formation of a transparent conductive layer of the present invention will be described.

An atmospheric pressure plasma method with a plasma treatment at near atmospheric pressure exhibits higher productivity as well as higher film formation rate than that of a plasma CVD method, since a reduced pressure process can be avoided, and the plasma density as well as productivity is also high. Further, the gas mean free path under the high pressure condition of atmospheric pressure is so short in comparison to that of the condition of the conventional CVD method, that a very smooth film exhibiting excellent optical properties can be obtained.

A transparent conductive layer of the present invention is formed on a transparent substrate by exposing the transparent substrate to excited gas after excitation by supplying the gas containing a transparent conductive layer forming gas into discharge space in which high frequency electric field is generated at atmospheric pressure or at near atmospheric pressure.

Atmospheric pressure or near atmospheric pressure in the present invention is approximately 20-110 kPa, but preferably 93-104 kPa in order to obtain the excellent effect described in the present invention.

Further, "excited gas" described in the present invention means that at least a part of molecules in a gas is moved to a high energy level from the present low energy level by receiving energy, and applicable is a gas containing excited gas molecules, radical gas molecules or ionized gas molecules.

That is, discharge space between facing electrodes is arranged to be designed at atmospheric pressure or at near atmospheric pressure, and the gas containing a discharge gas and a metal oxide forming gas (transparent conductive layer forming gas) is introduced into the discharge space between facing electrodes to set the metal oxide-forming gas at a plasma state by applying a high frequency voltage between the facing electrodes. Subsequently, the substrate is exposed to the metal oxide forming gas at the plasma state to form a transparent conductive substrate on the transparent substrate.

Next, the gas to form a transparent conductive layer of the present invention will be described. The gas employed in the present invention is a gas basically containing a discharge gas and a transparent conductive layer forming gas.

The discharge gas is at an excitation or at a plasma state to be a gas which plays a role in producing excitation or a plasma state by energizing a transparent conductive layer forming gas in a discharge space, and it is a feature that nitrogen gas is utilized as the gas. The nitrogen gas preferably has a content of 70.0-99.9% by volume, based on the total gas of 100% by volume.

As to formation of a transparent conductive layer of the present invention, the transparent conductive layer forming gas is a gas in which an excited state or a plasma state is generated by receiving energy from a discharge gas in a discharge space to form a transparent conductive film, or by which reaction is also controlled or accelerated. This transparent conductive layer forming gas preferably has a content of 0.01-30% by volume, based on the total gas, and more preferably has a content of 0.1-3% by volume.

As to formation of the transparent conductive layer of the present invention, the resulting transparent conductive film can be made more evenly and densely by containing a reducing gas selected from hydrogen, hydrocarbon such as methane, and $H_2O$ gas in a transparent conductive layer forming gas, whereby properties such as conductivity, adhesion and crack resistance can be improved. The reducing gas preferably has a content of 0.0001-10% by volume, based on the total gas of 100% by volume, and more preferably has a content of 0.001-5% by volume.

A transparent conductive layer of the present invention is formed by exposing the layer to a gas obtained by exciting a discharge gas or an oxidizing gas at a plasma state, but usable examples of the oxidizing gas include oxygen, ozone, hydrogen peroxide, carbon dioxide and so forth. Examples of the discharge gas in this case include helium and argon. The concentration of the oxidizing gas component is preferably 0.0001-30% by volume, based on the mixture of the oxidizing gas with the discharge gas, more preferably 0.001-15% by volume, and still more preferably 0.01-10% by volume. An optimal concentration value of each gas can be selected by appropriately setting the conditions of a substrate temperature, the trial number of oxidation treatment and treating time. As the oxidizing gas, oxygen and carbon dioxide are preferable, but a mixture of oxygen with argon is more preferable. Further, inert gas such as argon, helium or the like having a content of several %-several tens % can be mixed in order to control the discharge region.

Next, the atmospheric pressure plasma method of the present invention will be described referring to figures.

An atmospheric pressure plasma discharge treatment apparatus applicable in the present invention is not specifically limited, but it is classified into the following two types.

One is a method called a remote plasma type atmospheric pressure plasma discharge treatment apparatus in which high frequency voltage is applied between facing electrodes, a mixed gas containing discharge gas is supplied between the facing electrodes to make the mixed gas to be at a plasma state, and after mixing the mixed gas at a plasma state and a transparent conductive layer forming gas, they are sprayed onto a transparent substrate to form the transparent conductive layer.

Another one is a method called a direct plasma type atmospheric pressure plasma discharge treatment apparatus in which after mixing a mixed gas containing discharge gas and a transparent conductive layer forming gas, in the situation where the transparent substrate is supported between facing electrodes, the above-described gas is introduced into the discharge space, high frequency voltage is applied between the facing electrodes to form a transparent conductive layer on a transparent substrate.

In the present invention, more preferably employed is a remote plasma type atmospheric plasma method, that is, a method with a remote plasma type atmospheric plasma discharge treatment apparatus in which a substrate, on which a film is formed, is provided in a region other than a spacing between electrodes.

Figure 4:
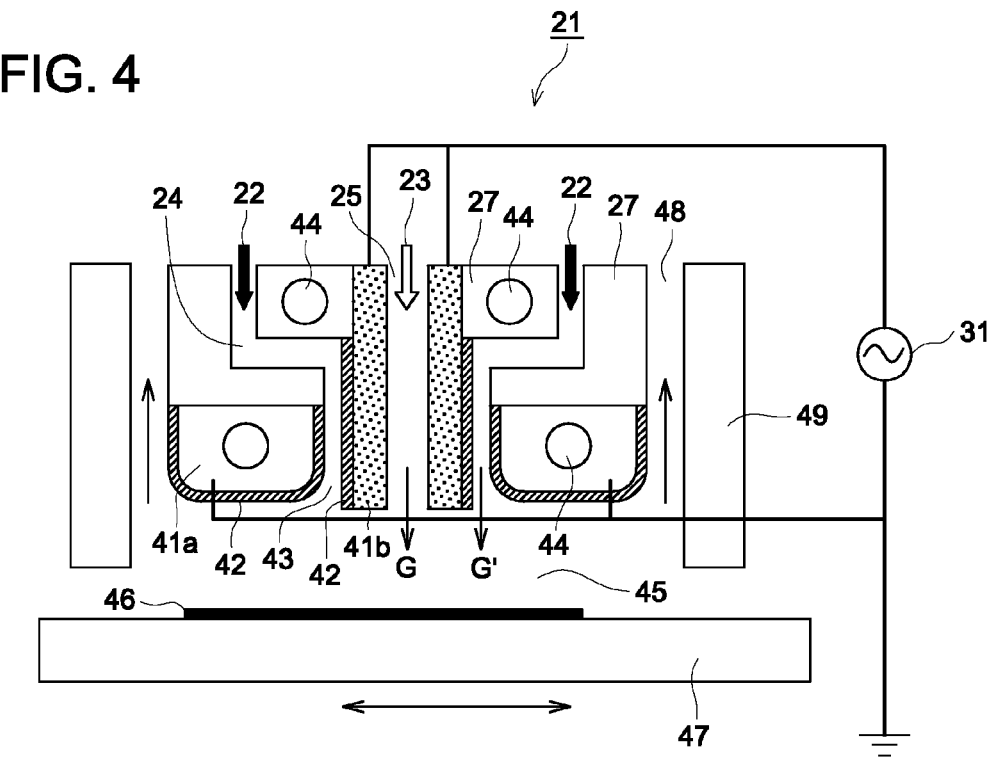
FIG. 4 is a schematic diagram showing an example of a remote plasma type atmospheric pressure plasma discharge treatment apparatus of the present invention.

FIG. 4 is a schematic diagram showing an example of a remote plasma type atmospheric pressure plasma discharge treatment apparatus of the present invention. Incidentally, the present invention is not limited thereto. Further, the following description might contain assertive expression with respect to terms and the like, but since preferred examples of the present invention are described, significance of the terms and technological scope in the present invention are not limited.

In FIG. 4, in atmospheric plasma discharge treatment apparatus 21, two sets of a pair of electrodes 41a and 41b are provided parallel to each other. At least one side of each of electrodes 41a and 41b is covered with dielectric 42, and high frequency voltage is designed to be applied in discharge space 43 formed between the electrodes by electric power supply 31.

Hollow structure 44 is produced inside each of electrodes 41a and 41b, heat generated during discharge is removed by water, oil or the like, and heat exchange is possible to be arranged to stably maintain temperature.

Gas 22 containing discharge gas for discharging is supplied in discharge space 43 through flow path 24 by each of unshown gas supplying devices, high frequency voltage is applied in this discharge space 43 to generate plasma discharge, and gas 22 containing discharge gas is to be at a plasma state. Gas 22 containing discharge gas at a plasma state is jetted into mixture space 45.

On the other hand, mixed gas 23 containing gas to form a transparent conductive layer, which has been supplied by each of unshown gas supplying devices, passes through flow path 25, is similarly conveyed to mixture space 45, mixed with foregoing discharge gas 22 at a plasma state via confluence with it, and jetted onto a transparent substrate mounted on movable stage 47 or a liquid crystal optical element unit possessing a transparent substrate provided on the outermost surface (hereinafter, referred to collectively as a substrate).

The transparent conductive layer forming gas brought into contact with the mixed gas at a plasma state is chemically reacted via activation of plasma energy to form a transparent conductive layer on substrate 46.

This remote plasma type atmospheric pressure plasma discharge treatment apparatus has such a structure in which the mixture gas containing gas to form a transparent conductive layer is sandwiched or surrounded by the activated discharge gases.

Movable stage 47 mounted on a substrate has a structure capable of reciprocating scanning or continuous scanning, and the structure is a heat-changeable structure similarly to the forgoing electrode so as to maintain temperature of a substrate, if desired.

Exhaust gas flow path 48 to evacuate gas jetted onto substrate 46 can be provided, if desired. By this, an undesired by-product formed in the space can be rapidly removed from discharge space 45 or substrate 46.

This remote plasma type atmospheric pressure plasma discharge treatment apparatus has a structure of confluence with a mixed gas containing gas to form a transparent conductive layer after the discharge gas is produced at a plasma state, and activated. It is inhibited by this to deposit a film forming product on the electrode surface, but a structure in which the discharge gas and the gas to form a transparent conductive layer are mixed before discharging can also be arranged to be set by attaching an anti-stain film or the like onto the electrode surface, as described in Japanese Patent O.P.I. Publication No. 2003-095367.

In the case of the apparatus described in FIG. 4, one frequency range is utilized for a high frequency power supply, but a system of providing a power supply of a different frequency for each of electrodes can also be used as described in Japanese Patent O.P.I. Publication No. 2003-96569.

The capability in film formation can also be raised by placing a plurality of remote plasma type atmospheric pressure plasma discharge treatment apparatuses in the scanning direction of the stage.

Further, a structure in which the electrodes and the stage are totally surrounded so as not to get the external air is not shown for this remote plasma type atmospheric pressure plasma discharge treatment apparatus, but the inside of the apparatus can remain in the constant gas atmosphere by using this structure, whereby transparent antistatic films exhibiting desired high quality can be prepared.

Figure 5:
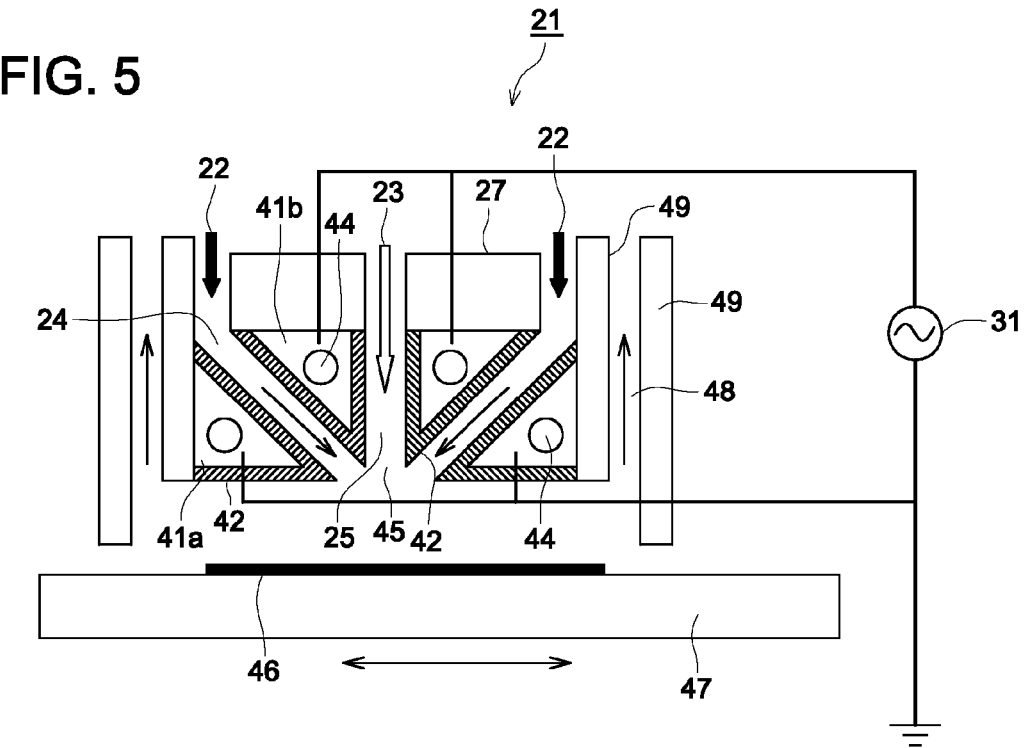
FIG. 5 is a schematic diagram showing another example of a remote plasma type atmospheric pressure plasma discharge treatment apparatus of the present invention.

FIG. 5 is a schematic diagram showing another example of a remote plasma type atmospheric pressure plasma discharge treatment apparatus of the present invention.

In the above-described FIG. 4, flow path 24 to supply gas 22 containing discharge gas is provided parallel to flow path 25 to supply mixed gas 23 containing gas to form a transparent conductive layer, but a method by which as shown in FIG. 5, flow path 24 to supply gas 22 containing discharge gas is obliquely formed, and mixing efficiency with mixed gas 23 supplied from flow path 25 is increased may be allowed to be used.

Figure 6:
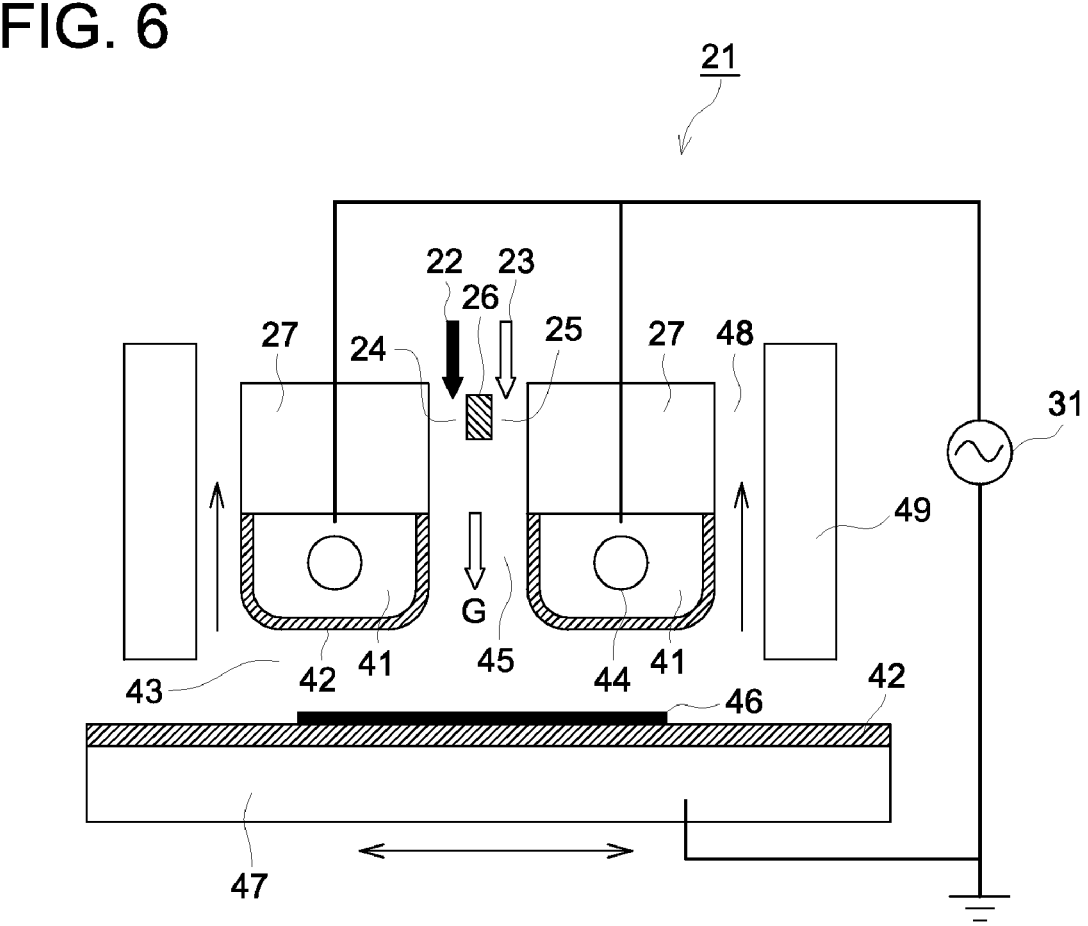
FIG. 6 is a schematic diagram showing an example of a direct plasma type atmospheric pressure plasma discharge treatment apparatus of the present invention.

FIG. 6 is a schematic diagram showing an example of a direct plasma type atmospheric pressure plasma discharge treatment apparatus of the present invention.

In direct plasma type atmospheric plasma discharge treatment apparatus 21 shown in FIG. 6, each of two electrodes 41 connected to power supply 31 is provided parallel to movable stage electrode 47. At least one side of each of electrodes 41 and 47 is covered with dielectric 42, and high frequency voltage is designed to be applied in discharge space 43 formed between electrodes 41 and 47 by electric power 31.

Hollow structure 44 is produced inside each of electrodes 41 and 47, heat generated during discharge is removed by water, oil or the like, and heat exchange is possible to be arranged to stably maintain temperature.

Further, from each of unshown gas supply devices, gas 22 containing discharge gas for discharging passes through flow path 24, and mixed gas 23 containing gas to form a transparent conductive layer also passes through flow path 25 to mix them in mixture space 45 via confluence. Mixed gas G passes through between electrodes 41 and supplied into space 43 between electrodes 41 and 47, and plasma discharge is generated when high frequency voltage is applied in space 43 to produce gas G at a plasma state. The transparent conductive layer forming gas is activated with gas G at a plasma state to produce chemical reaction, and a transparent conductive layer is formed on substrate 46 (a transparent substrate or a liquid crystal optical unit possessing a transparent substrate provided on the outermost surface).

Movable stage 47 mounted on a substrate has a structure capable of reciprocating scanning or continuous scanning, and the structure is a heat-changeable structure similarly to the forgoing electrode so as to maintain temperature of a substrate, if desired.

Exhaust gas flow path 48 to evacuate gas jetted onto substrate 46 can be provided, if desired. By this, an undesired by-product formed in the space can be rapidly removed from discharge space 45 or substrate 46.

A structure in which the discharge gas and the gas to form a transparent conductive layer are mixed before discharging can also be arranged to be set by attaching an anti-stain film or the like onto the electrode surface, as described in Japanese Patent O.P.I. Publication No. 2003-095367.

In the case of the apparatus described in FIG. 6, one frequency range is utilized for a high frequency power supply, but a system of providing a power supply of a different frequency for each of electrodes can also be used as described in Japanese Patent O.P.I. Publication No. 2003-96569.

The capability in film formation can also be raised by placing a plurality of direct plasma type atmospheric pressure plasma discharge treatment apparatuses in the scanning direction of the stage.

Further, a structure in which the electrodes and the stage are totally surrounded so as not to get the external air is not shown for this direct plasma type atmospheric pressure plasma discharge treatment apparatus, but the inside of the apparatus can remain in the constant gas atmosphere by using this structure, whereby transparent antistatic films exhibiting desired high quality can be prepared.

EXAMPLE

Next, the present invention will now be specifically described referring to examples, but the present invention is not limited thereto. Incidentally, "parts" and "%" in the description represent "parts by weight" and "% by weight", respectively unless otherwise specifically mentioned.

Example 1

Preparation of Liquid Crystal Display Element

[Preparation of Liquid Crystal Display Element 1]
(Preparation of Liquid Crystal Display Element Unit)

A full-color liquid crystal display element unit having a structure described in FIG. 2 was prepared in accordance with a method disclosed in Japanese Patent O.P.I. Publication No. 2002-258262, provided that no liquid crystal 13 was filled in liquid crystal layer 3.
(Formation of Transparent Conductive Layer)

A transparent conductive layer was formed on transparent substrate 5b described in FIG. 2 (glass substrate) with the following atmospheric plasma method employing a direct plasma type atmospheric pressure plasma discharge treatment apparatus (referred to as Plasma CVD method DP).
(Atmospheric Pressure Plasma Discharge Treatment Apparatus)

A transparent conductive layer was prepared under the following film forming conditions employing a direct plasma type atmospheric pressure plasma discharge treatment apparatus described in FIG. 6.
<Power Supply Condition>
Power supply: manufactured by Seren IPS Inc., 100 kHz 5 W/cm$^2$
<Electrode Condition>
The square-shaped electrode as the second electrode (41 in FIG. 6) was subjected to a ceramic thermal-spraying treatment to a 30 mm square-shaped hollow titanium pipe to prepare a dielectric.
Thickness of the dielectric: 1 mm
Electrode width: 300 mm
Applied electrode temperature: 90° C.
Slit gap between the second electrodes: 1.0 mm
Gap between electrodes: 1.0 mm.

<Gas Condition>
Tetrabutyltin was vaporized via bubbling.
Nitrogen gas: 5 slm, 80° C.
Discharge gas: Nitrogen, 100 slm
Auxiliary gas: Hydrogen, 0.3 slm
<Movable Stage Electrode (47 in FIG. 6)>
Material: SUS316L
Temperature of the movable stage electrode: 80° C.

The above-described resulting liquid crystal display element unit was placed on the movable stage electrode so as to have transparent substrate 5b provided on the outermost surface, and a scanning treatment was continuously conducted under the condition of 100 mm/sec to form a transparent conductive layer having a thickness of 12 nm. In addition, slm stands for Standard Litter per minutes.

[Preparation of Liquid Crystal Display Element 2]

A transparent conductive layer is formed on transparent substrate 5b described in FIG. 2 employing a liquid crystal display element unit prepared in the above-described "liquid crystal display element 1", and the following atmospheric pressure plasma method (with a remote plasma type atmospheric pressure plasma discharge treatment apparatus) (referred to as Plasma CVD method PJ).

(Atmospheric Pressure Plasma Discharge Treatment Apparatus)

A transparent conductive layer was prepared under the following film forming conditions employing a remote plasma type atmospheric pressure plasma discharge treatment apparatus described in FIG. 4.

<Power Supply Condition>
Power supply: manufactured by Seren IPS Inc., 100 kHz 5 W/cm$^2$ <Electrode Condition>
[Electrode 1 (41a in FIG. 4)]
Square-shaped electrode 41a was subjected to a ceramic thermal-spraying treatment to a 30 mm square-shaped hollow titanium pipe to prepare a dielectric.
Thickness of the dielectric: 1 mm
Electrode width: 300 mm
Applied electrode temperature: 90° C.

[Electrode 2 (41b in FIG. 4)]
Electrode 41b was subjected to a ceramic thermal-spraying treatment to a titanium plate having a thickness of 4 mm to prepare a dielectric. Further, as shown in FIG. 4, a 20 mm square-shaped hollow titanium pipe was installed as a electrode 41 cooling member.
(Discharge) gap between electrodes: 0.5 mm
Gap between the movable stage and the electrode: 1.0 mm <Gas Condition>
Tetrabutyltin was vaporized via bubbling.
Ar gas: 1 slm, 20° C.
Discharge gas: Nitrogen, 200 slm
Auxiliary gas: Oxygen, 0.3 slm The above-described resulting liquid crystal display element unit was placed on the movable stage so as to have transparent substrate 5b provided on the outermost surface, and a scanning treatment was continuously conducted under the condition of 10 mm/sec to form a transparent conductive layer having a thickness of 12 nm.

[Preparation of Liquid Crystal Display Element 3]

A transparent conductive layer is formed on transparent substrate 5b shown in FIG. 2 by the following sputtering method employing a liquid crystal display element unit prepared in the above-described "liquid crystal display element 1".

(Formation of Transparent Conductive Layer Via Sputtering)

After mixing $In_2O_3$ powder having a purity of 99.99% and $SnO_2$ powder having a purity of 99.99% in a weight ratio of 92:8, molding and calcining were conducted to prepare an $In_2O_3$—$SnO_2$ system high density sintered body having a diameter of 20 cm. The resulting $In_2O_3$—$SnO_2$ system high density sintered body was placed in a batch type DC magnetron sputtering apparatus to form a transparent conductive layer. The magnetic flux density on a sputtering target was set to 1000 Gauss. Ar gas or a mixed gas of argon and oxygen is used as a sputtering gas and introduced into a chamber through another system to set the ultimate vacuum degree in the chamber to $5 \times 10^{-4}$ Pa or less, and to set the gas pressure during sputtering to 0.5 Pa, and an $In_2O_3$—$SnO_2$ system transparent conductive layer having a thickness of 10 nm was formed on transparent substrate 5b in a liquid crystal display element unit having been heated to 100° C. in 10 minutes.

[Preparation of Liquid Crystal Display Element 4]

A transparent conductive layer is formed on transparent substrate 5b shown in FIG. 2 by the following coating process employing a liquid crystal display element unit prepared in the above-described "liquid crystal display element 1".

(Preparation of Sn-Doped Indium Oxide (ITO) Particle Dispersion A)

A solution obtained by dissolving 80 g of indium nitrate in 700 g of water and another solution obtained by dissolving 12 g of potassium stannate in 10% by weight of a potassium hydrate solution were prepared, and these solutions were added into 1000 g of pure water maintained at 50° C. spending one hour while keeping pH in the system at 11. After Sn-doped indium oxide was filtrated from the resulting Sn-doped indium oxide hydrate dispersion and washed, and it was dispersed in water again to prepare a metal oxide precursor hydroxide dispersion having a solid content of 10% by weight. This metal oxide precursor hydroxide dispersion was sprayed while drying at a temperature of 100° C. to prepare metal oxide precursor hydroxide powder. This metal oxide precursor hydroxide powder was subjected to a heat treatment under nitrogen gas atmosphere at 550° C. for 2 hours.

Next, after the resulting was dispersed in ethanol so as to give a concentration of 30% by weight, and further adjusted to a pH of 3.5 with an aqueous nitric acid solution, this mixed solution was crushed by a sand mill for 0.5 hours while keeping this at 30° C. to prepare sol. Next, Sn-doped indium oxide particle dispersion A having a concentration of 20% by weight was prepared by introducing ethanol. An average particle diameter measured with SEM was 25 nm.

(Preparation of Colorant Particle Dispersion B)

Thirty two grams of carbon black particles (MA230, produced by Mitsubishi Chemical Corporation), 268 g of ethyl alcohol, 40 g of tetrabuthoxy zirconium (ZR-181, $ZrO_2$ having a content of 15% by weight, produced by Nippon Soda Co., Ltd.), and 3 g of a nitric acid were mixed, and the mixed solution was treated by a sand mill for 1.5 hours to prepare colorant particle dispersion B having a solid content of 9.7% by weight. Carbon black particles in colorant particle dispersion B had an average particle diameter of 40 nm.

(Preparation of Transparent Conductive Layer Forming Coating Solution)

Sn-doped indium oxide (ITO) particle dispersion A prepared above and colorant particle dispersion B were mixed so as to give a content ratio of 86:14, and the resulting was further diluted with a polar solvent (ethanol/isopropyl glycol/diacetone alcohol=a weight ratio of 80/15/5) so as to give a solid content of 1.0% to prepare a transparent conductive layer forming coating solution.

(Formation of Transparent Conductive Layer)

The above-described transparent conductive layer forming coating solution was coated on transparent substrate 5b at 200 rpm for 90 seconds by a spinner method while keeping a liquid crystal display unit at 35° C., and dried. The film thickness in this case was 80 nm. Next, a calcinations treatment was conducted at 180° C. for 30 minutes to form a transparent conductive layer.

Evaluation of Liquid Crystal Display Element

[Evaluation of Effect Extent Level to Liquid Crystal Display Element]
(Evaluation of Operation Ability of Display Element)

After liquid crystals were filled in a liquid crystal layer in each of the prepared liquid crystal display elements, the resulting system was operated to confirm presence or absence of operation failure caused by short-circuiting or the like. The case of normal operation was evaluated as "pass", and the case of operation failure caused by short-circuiting or the like was evaluated as "fail".

(Evaluation of Suitability for Transparent Substrate)

The broken condition of transparent substrate 5b on which a transparent conductive layer in each of the prepared liquid crystal display elements was formed was visually observed, and one, in which no damage was generated, was evaluated as "pass", and one, in which damage even if only partially, was generated was evaluated as "fail".

[Measurement of Surface Specific Resistance of Transparent Conductive Layer]

Surface specific resistance ($\Omega/\square$) of each of transparent conductive layers was measured at an applied voltage of 10V with a measuring time of 10 seconds under the condition of normal temperature and normal humidity (at a temperature of 26° C. and a relative humidity of 50%) employing hyrester IP (MCP-HT450) manufactured by Mitsubishi chemical holdings Corporation), and Probe MCP-HTP12.

Concerning the surface specific resistance value determined in accordance with the above-described measurement;

A: in the case of a surface specific resistance of less than $1\times10^5$ ($\Omega/\square$).

B: in the case of a surface specific resistance of at least $1\times10^5$ ($\Omega/\square$) and less than $1\times10^8$ ($\Omega/\square$).

C: in the case of a surface specific resistance of at least $1\times10^8$ ($\Omega/\square$).

[Evaluation of Optical Performance of Transparent Conductive Layer]

After preparing each of liquid crystal display elements described above, substrate 5b fitted with a color filter on which a transparent conductive layer was formed was taken out via taking apart. Then, the transparent substrate surface on the side opposite the surface on which the transparent conductive layer was formed was subjected to mechanical polishing to exfoliate the color filter, and a transparent substrate having a thickness of 0.3 mm was prepared. The haze value and total luminous transmittance of this substrate were obtained for comparison.

(Measurement of Haze Value)

The measurement was conducted in accordance with JIS K7105 employing a haze meter (Product name: Meter NDH2000, manufactured by Nippon Denshoku Industries Co., Ltd.).

Concerning the haze value determined in accordance with the above-described measurement;

A: in the case of a haze value of 0.3% or less.

B: in the case of a haze value of at least 0.31% and less than 1.0%.

C: in the case of a haze value of at least 1.0%.

(Measurement of Total Luminous Transmittance)

The total luminous transmittance was measured employing a spectrophotometer (Product name: UV3100, manufactured by Shimadzu Corporation).

In addition, as to the total luminous transmittance of a transparent conductive layer, the foregoing transparent substrate sample having a thickness of 0.3 mm on which the transparent conductive layer was formed was measured (transmittance A). Further, a sole transparent substrate sample having a thickness of 0.3 mm on which no transparent conductive layer described above was formed was similarly measured (transmittance B) to determine total luminous transmittance C of the transparent conductive layer in accordance with the following equation.

$$\text{Transmittance } C \text{ of transparent conductive layer} = (\text{Transmittance } A/\text{Transmittance } B) \times 100$$

Concerning the determined transmittance C of the transparent conductive layer;

A: in the case of total luminous transmittance C of the transparent conductive layer obtained via the above-described measurement being at least 99%.

B: in the case of total luminous transmittance C of the transparent conductive layer obtained via the above-described measurement being 96-98%.

C: in the case of total luminous transmittance C of the transparent conductive layer obtained via the above-described measurement being 95% or less.

[Evaluation of Interference Unevenness and White Turbidity]

An antistatic layer of each substrate described above placed on a black board was exposed to a fluorescent lamp from above to visually observe presence or absence of shading in interference unevenness and white turbidity unevenness.

A: in cases where no unevenness was observed.

B: in cases where slight unevenness was observed.

C: in cases where unevenness was substantially observed.

[Evaluation of Adhesion of Transparent Conductive Layer]

An adhesive cellophane tape (industrial cellophane tape having a width of 24 mm, produced by Nichiban Co., ltd.) was attached onto the surface of each transparent conductive layer and peeled at the same place repeatedly ten times, and the number until the transparent conductive layer was peeled was determined to evaluate adhesion in accordance with the following aciteria.

A: No transparent conductive layer was peeled even after attaching and peeling the tape ten times.

B: A transparent conductive layer was peeled via the step of attaching and peeling the tape 4-9 times.

C: A transparent conductive layer was peeled via the step of attaching and peeling the tape on the first try.

[Evaluation of Pencil Hardness]

The pencil hardness of antistatic layer surface of each substrate described above was measured. The pencil hardness was measured employing a pencil hardness tester (manufactured by Yoshimitsu Seiki Co., Ltd.) in accordance with JIS K 5400.

Concerning the evaluated pencil hardness;

A: at least 6H.

B: in the range between 3H and 5H.

C: 2H or less.

The evaluated results described above are shown in Table 1.

TABLE 1

| Liquid crystal display element No. | Transparent conductive layer forming method | Effect extent level to display element | | Characteristics of formed transparent conductive layer | | | | | | |
|---|---|---|---|---|---|---|---|---|---|---|
| | | Operation ability | Suitability for transparent substrate | Haze | Total luminous transmittance | Interference unevenness White turbidity unevenness | Surface specific resistance | Adhesion | Pencil hardness | Remarks |
| 1 | Plasma CVD method DP | Pass | Pass | A | B | A | A | A | A | Inv. |
| 2 | Plasma CVD method PJ | Pass | Pass | A | A | A | A | A | A | Inv. |
| 3 | Sputtering method | Fail | Fail | A | B | C (White turbidity unevenness) | A | B | B | Comp. |
| 4 | Coating process | Pass | Pass | C | C | C (Interference unevenness) | C | C | C | Comp. |

Inv.: Present invention, Comp.: Comparative examples

As is clear from the results described in Table 1, it is to be understood that samples of the present invention in which a transparent conductive layer is formed by an atmospheric pressure plasma method employing nitrogen gas specified in the present invention exhibit no adverse effect to constituting parts installed in a liquid crystal display element, and excellent productivity, together with excellent properties of those such as optical transparency (transparency) of the resulting transparent conductive layer, conductivity (surface specific resistance), evenness, adhesion to a transparent substrate, and hardness of a film, in comparison to comparative examples.

Example 2

Preparation of Liquid Crystal Display Element

Liquid crystal display elements 5-8 were prepared via formation of a transparent conductive layer by each method described in Example 1 with presence of liquid crystals in a liquid crystal display similarly to assembling in preparation of liquid crystal display elements 1-4 in Example 1, except that a sealing member was provided in a peripheral region surrounding a display region before placing a transparent substrate with an ODF method, and liquid crystals were dropped thereon subsequently to form a liquid crystal layer by covering a transparent substrate on the upper side. The transparent conductive layer forming methods used in preparation of liquid crystal display elements 5-8 correspond to transparent conductive layer forming methods used in preparation of liquid crystal display elements 1-4 in Example 1, respectively.

Evaluation of Liquid Crystal Display Element

As to each of the resulting liquid crystal display elements, productivity, optical transparency of the transparent conductive layer (Total luminous transmittance), conductivity (surface specific resistance) and adhesion, together with liquid crystal resistance were evaluated.

(Evaluation of Liquid Crystal Resistance)

As to each of the resulting liquid crystal display elements, presence or absence of generation of bubbles in a liquid crystal layer, and presence or absence of discoloration were confirmed to evaluate liquid crystal resistance in accordance with the following criteria.

A: No bubble is generated in a liquid crystal layer, and no liquid crystal is also changed in quality.

B: Generation of extremely small bubbles in a liquid crystal layer is slightly observed, but no liquid crystal is changed in quality, resulting in practically tolerable quality.

C: Generation of bubbles in a liquid crystal layer is clearly observed.

D: Not only generation of bubbles in a liquid crystal layer is observed, but also liquid crystals changed in quality are observed.

Results obtained from the above-described are shown in Table 2.

TABLE 2

| Liquid crystal display element No. | Transparent conductive layer forming method | Liquid crystal resistance | Characteristics of formed transparent conductive layer | | | | | | |
|---|---|---|---|---|---|---|---|---|---|
| | | | Haze | Total luminous transmittance | Interference unevenness White turbidity unevenness | Surface specific resistance | Adhesion | Pencil hardness | Remarks |
| 5 | Plasma CVD method DP | A | A | B | A | A | A | A | Inv. |
| 6 | Plasma CVD method PJ | A | A | A | A | A | A | A | Inv. |
| 7 | Sputtering method | C | | Not evaluated | | | | | Comp. |
| 8 | Coating process | D | | Not evaluated | | | | | Comp. |

Inv.: Present invention, Comp.: Comparative examples

As is clear from results described in Table 2, it is to be understood that samples of the present invention in which a transparent conductive layer is formed by an atmospheric pressure plasma method employing nitrogen gas specified in the present invention exhibit no adverse effect to the liquid crystal layer, excellent productivity, together with excellent optical transparency of the formed transparent conductive layer (total luminous transmittance), excellent conductivity (surface specific resistance) and excellent adhesion to a transparent substrate.

The invention claimed is:

1. A method of manufacturing a liquid crystal display device comprising a liquid crystal display panel and a backlight unit to transmit light on a display surface side of the liquid crystal display panel,
wherein the liquid crystal display panel has a structure in which a display electrode and a reference electrode are provided on a surface of a region corresponding to a unit pixel on a liquid crystal layer side of one transparent substrate or each of both transparent substrates among the transparent substrates provided facing to each other via the liquid crystal layer, and light transmitting the liquid crystal layer is modulated by electric field generated parallel to the transparent substrate between the reference electrode and the display electrode to which a picture signal is supplied from a picture signal line via at least a switching element,
wherein the transparent substrate situated on a remote position side with respect to the backlight unit among the transparent substrates in the liquid crystal display panel is the transparent substrate on a side of a position where no switching element is formed, and has a transparent conductive layer exhibiting optical transparency on a surface side opposite the liquid crystal layer of the transparent substrate, and
the method of manufacturing a liquid crystal display device comprising:
forming the transparent conductive layer in at least a pixel region by an atmospheric pressure plasma method employing at least nitrogen gas as a thin film forming gas; and
operating the liquid crystal display panel having a structure in which a display electrode and a reference electrode are provided on a surface of a region corresponding to a unit pixel on a liquid crystal layer side of one transparent substrate among the transparent substrates provided facing to each other via the liquid crystal layer with an in-plane switching system by which light transmitting the liquid crystal layer is modulated by electric field generated parallel to the transparent substrate between the reference electrode and the display electrode to which a picture signal is supplied from a picture signal line via at least a switching element.

2. The method of claim 1,
wherein the atmospheric pressure plasma method is a remote plasma type atmospheric pressure plasma method with which a substrate, on which a film is formed, is provided in a region other than a spacing between electrodes.

3. The method of claim 1, comprising the step of:
forming the transparent conductive layer exhibiting optical transparency on a surface side opposite the liquid crystal layer of the transparent substrate by the atmospheric pressure plasma method with at least nitrogen gas as a thin film forming gas, after filling liquid crystals in the liquid crystal layer provided between the transparent substrates.

4. A liquid crystal display device comprising a liquid crystal display panel and a backlight unit to transmit light on a display surface side of the liquid crystal display panel,
wherein the liquid crystal display panel has a structure in which a display electrode and a reference electrode are provided on a surface of a region corresponding to a unit pixel on a liquid crystal layer side of one transparent substrate or each of both transparent substrates among the transparent substrates provided facing to each other via the liquid crystal layer, and light transmitting the liquid crystal layer is modulated by electric field generated parallel to the transparent substrate between the reference electrode and the display electrode to which a picture signal is supplied from a picture signal line via at least a switching element, the liquid crystal display panel further having a structure in which a display electrode and a reference electrode are provided on a surface of a region corresponding to a unit pixel on a liquid crystal layer side of one transparent substrate among the transparent substrates provided facing to each other via the liquid crystal layer, operated with an in-plane switching system by which light transmitting the liquid crystal layer is modulated by electric field generated parallel to the transparent substrate between the reference electrode and the display electrode to which a picture signal is supplied from a picture signal line via at least a switching element,
wherein the transparent substrate situated on a remote position side with respect to the backlight unit among the transparent substrates in the liquid crystal display panel is the transparent substrate on a side of a position where no switching element is formed, and has a transparent conductive layer exhibiting optical transparency on a surface side opposite the liquid crystal layer of the transparent substrate, and
the method of manufacturing a liquid crystal display device comprising:
forming the transparent conductive layer in at least a pixel region by an atmospheric pressure plasma method employing at least nitrogen gas as a thin film forming gas.

5. The liquid crystal display device of claim 4 according to the atmospheric pressure plasma method, comprising a liquid crystal display device according to a remote plasma type atmospheric pressure plasma method with which a substrate, on which a film is formed, is provided in a region other than a spacing between electrodes.

6. The liquid crystal display device of claim 4, comprising the transparent conductive layer exhibiting optical transparency on a surface side opposite the liquid crystal layer of the transparent substrate, that is formed by the atmospheric pressure plasma method with at least nitrogen gas as a thin film forming gas, after filling liquid crystals in the liquid crystal layer provided between the transparent substrates.

* * * * *